United States Patent [19]

Francois et al.

[11] Patent Number: 4,567,417
[45] Date of Patent: Jan. 28, 1986

[54] ACTUATOR

[75] Inventors: Daniél Francois; Gilles Mercey, both of Vendome, France

[73] Assignee: La Calhene, Societe Anonyme, Bezons, France

[21] Appl. No.: 442,160

[22] Filed: Nov. 16, 1982

[30] Foreign Application Priority Data

Nov. 24, 1981 [FR] France ................................ 81 21968

[51] Int. Cl.$^4$ ............................................. G05B 11/01
[52] U.S. Cl. .................................... 318/632; 318/675
[58] Field of Search ............... 318/561, 568, 675, 676, 318/632; 364/513, 550, 551; 901/8, 9, 10, 25, 29, 38; 310/68 A, 68 B

[56] References Cited

U.S. PATENT DOCUMENTS

| 1,946,100 | 2/1934 | Norton | 73/862.33 |
| 3,593,094 | 7/1971 | Katsumaru | 318/568 |
| 3,845,284 | 10/1974 | Taguchi | 901/9 X |
| 3,921,445 | 11/1975 | Hill et al. | 73/862.04 |
| 4,046,262 | 9/1977 | Vykukal et al. | 414/5 |
| 4,056,763 | 11/1977 | Debrie | 318/565 |
| 4,278,920 | 7/1981 | Ruoff | 318/568 X |
| 4,298,308 | 11/1981 | Richter | 318/568 X |
| 4,300,198 | 11/1981 | Davini | 318/568 X |
| 4,362,978 | 12/1982 | Pollard | 318/632 X |
| 4,408,286 | 10/1983 | Kikuchi | 318/568 X |
| 4,424,473 | 1/1984 | Gorman | 318/568 |

FOREIGN PATENT DOCUMENTS

| 385792 | 11/1923 | Fed. Rep. of Germany . |
| 2112214 | 9/1971 | France . |
| 2297698 | 1/1975 | France . |

Primary Examiner—Stanley J. Witkowski
Assistant Examiner—Patrick C. Keane
Attorney, Agent, or Firm—Pearne, Gordon, Sessions, McCoy, Granger & Tilberry

[57] ABSTRACT

The invention relates to an actuator and to its application to the position servocontrol for a master-slave remote manipulator.

The actuator comprises a box or case in which are housed an electric motor, a slightly or non-reversible reducing gear and a torsion bar connecting the led part of the gear to an actuating plate outside the box. Potentiometers make it possible to define the position of the led part with respect to the box and the force applied to the torsion bar. Thus, it is possible to artificially provide the gear with good reversibility characteristics.

Application to any movement control in robotics and particularly to the production of miniaturized master arms, master-slave remote manipulators with force return and without either a cable or belt, and to the control of heavy arms.

9 Claims, 5 Drawing Figures

ACTUATOR

BACKGROUND OF THE INVENTION

The present invention relates to an actuator and its use for position servocontrol purposes for controlling any random positioning and orientation movement of the master arm or slave arm of a master-slave remote manipulator.

More specifically the invention relates to an actuator, which can be used in place of each of the cable or belt-operated actuators used at present and which makes it possible to provide a miniaturized master arm having the same reversibility characteristics as a master arm operated by cable or belt means.

It is known that the presently used cable or belt-operated actuators have the important advantage of being mechanically reversible, i.e. they permit both the transmission to the slave arm of a movement from the master arm and the transmission to the master arm of a resistance encountered by the slave arm, when the remote manipulator is in a force or stress return state. However, these actuators have a certain number of disadvantages, two of the most important of these being the large overall dimensions more particularly resulting from the presence of pulleys effecting the reduction for a given movement and the weakness and brittleness of the cables and belts, which involves frequent maintainance.

The first of these disadvantages makes it impossible to envisage the use of these conventional actuators, when the conditions of use of the remote manipulator necessitates e.g. a miniaturization of the master arm. This is in particular the case when the remote manipulator has to carry out underwater manipulations and when it is controlled from a small-size underwater vessel, in which the available space for the master arm can e.g. be limited to a spherical portion with a diameter of 50 cm.

With regards to the weakness of the cables or tapes, this causes operating constraints with respect to the slave arm, particularly when the remote manipulator is used in the nuclear field. Thus, it is then necessary to perform a decontamination of the slave arm or its repair in an irradiated medium, which leads in all cases to operational disadvantages.

BRIEF SUMMARY OF THE INVENTION

The present invention relates to the construction of an actuator, which does not have the disadvantages of cable or belt-operated actuators, whilst still ensuring a reversibility of the movements so as to provide a force return manipulator.

For this purpose and according to the invention, a small electric motor having a relatively high initial speed is used and to it is added a reducing gear having a high reduction ratio, in order to satisfy both the size and force requirements. In view of the fact that such a reducing gear is only slightly or not reversible, it is necessary to restore to it a good reversibility by adding appropriate means. According to the invention, these means are angularly flexible mechanical connection means, which are sensitive to the force applied, as well as means for detecting this force.

More specifically, the present invention relates to an actuator, wherein it comprises a box or case, an electric motor whose stator is fixed within the said box or case, a speed reducing gear located in the box or case and whose leading part is driven by the rotor of the electric motor, an actuating part outside the box or case and connected to the led part of the reducing gear by angularly flexible mechanical connection means, means for detecting a first angular displacement between the actuating part and the led part, and means for detecting a second angular displacement between the led part and the box or case.

The flexible connection means can in particular be formed by a torsion bar or two spiral springs mounted in opposition.

According to a preferred embodiment of the invention, the actuator also comprises a rigid tubular shaft arranged coaxially about the torsion bar in order to connect the led part of the reducing gear to a reference plate, whose opposite faces are respectively positioned facing a surface of the box and a surface of the actuating part, the means for detecting the first and second angular displacements being respectively mounted between the said surface of the actuating part and the corresponding surface of the plate and between the surface of the box and the corresponding surface of the plate.

The invention also relates to an application to a position servocontrol for a master-slave remote manipulator, comprising a master arm and a slave arm, each defining a plurality of movements, wherein each movement of at least one of the arms of the remote manipulator is controlled by an actuator and wherein the servocontrol comprises third means for detecting the position corresponding to the same movement of the other arm, fourth means for determining the difference between the signal supplied by the second means and the signal supplied by the third means and fifth means for determining the difference between the signal supplied by the fourth means and the signal supplied by the first means, the signal supplied by said fifth means serving to control the electric motor.

Preferably, this servocontrol also comprises sixth means for limiting to a given value the level of the signals transmitted by the fourth means to the fifth means.

According to another feature of the invention, each movement of the other arm is controlled by a second actuator with which are associated the third means and the eighth means for determining the force exerted by said second actuator and the servocontrol also comprises ninth means for determining the difference between the signals supplied by the fourth means and by the eighth means, the signal supplied by the ninth means serving to control the second actuator.

Preferably the servocontrol according to the invention also comprises means for limiting to a given value the level of the signals transmitted by the fourth means to the ninth means.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
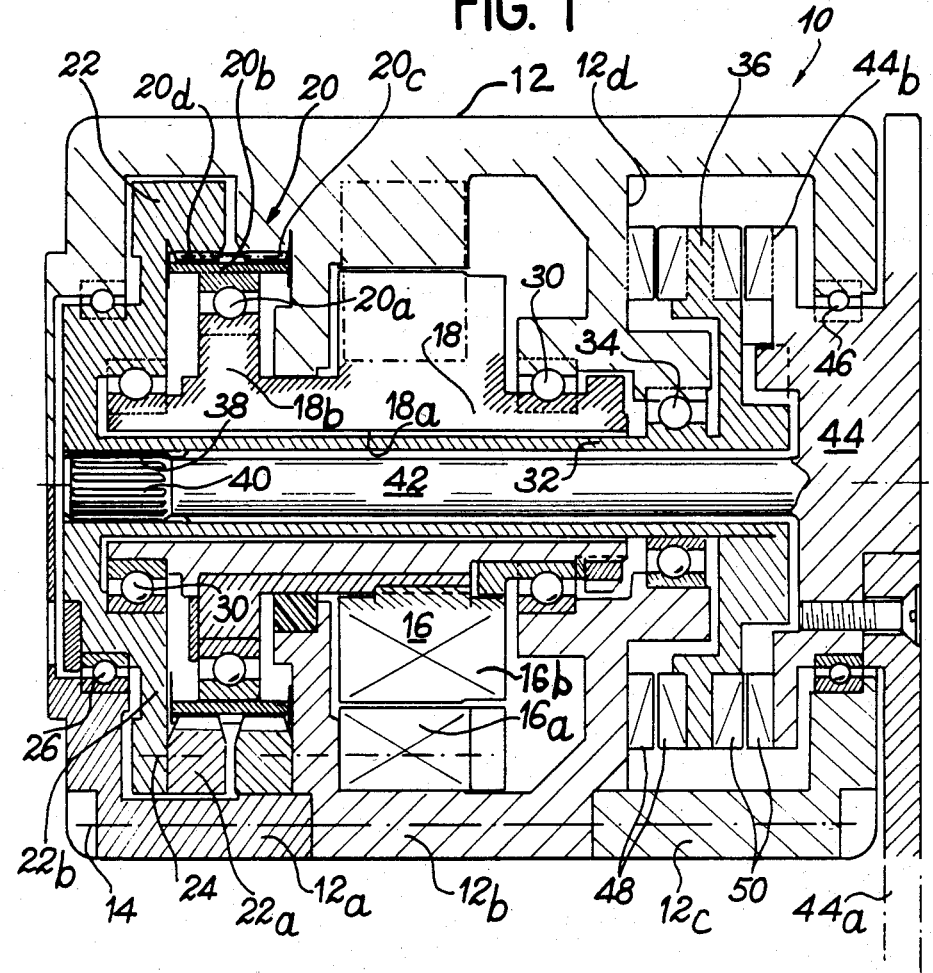
FIG. 1 a longitudinal sectional view of an actuator according to the invention.

The lower part of FIG. 1 shows the construction of the various members of the actuator according to the invention as realized in practice, whilst its upper part diagrammatically shows the various assemblies constituted by these members.

Thus, it can be seen in FIG. 1 that the actuator 10 according to the invention comprises a cylindrical case or box 12, which in fact is formed by three parts 12a, 12b, 12c, which are stacked and assembled by ties, one of which is symbolically shown by a mixed line 14. The stator 16a of a relatively fast electric motor 16 is fixed in the central part 12b of box 12. Rotor 16b of the electric motor is fixed to a member 18 having a bore 18a and mounted in rotary manner within box 12, about the axis common to the latter and to bore 18a. Member 18 constitutes the leading part of a reducing gear 20 having a high reduction ratio. This gear, which will be described in greater detail hereinafter, is only slightly or not reversible due to its high reduction ratio. In rotation, it drives a toothed ring 22a forming one of the elements of the led part 22 of the gear at a relatively low speed compared with that of the leading part 18. The led part 22 also comprises a flange 22b, to which is fixed toothed ring 22a by screws, one of which is symbolized by a mixed line 24.

The reducing gear 20, as well as the led part 22, are located in part 12a, which closes one of the ends of the box. The led part 22 is mounted in rotary manner within said part 12a via a ball bearing 26.

The leading part 18 is essentially shaped like a hollow shaft and extends into the interior of box parts 12a, 12b. It is supported in rotary manner by one of its ends in flange 22b and by its opposite end in box part 12b, via two ball bearings 30.

The led part 22 is integral with a rigid tubular shaft 32 arranged coaxially within bore 18a formed in the leading part. Tubular shaft 32 completely traverses the leading part 18 and projects at the end thereof opposite to flange 22b. This projecting end of shaft 32 is supported in rotary manner by part 12b of the box, via a ball bearing 34. In addition, it is extended beyond ball bearing 34 to form a reference plate 36 disposed in part 12c of the box.

At flange 22b, the rigid tubular shaft 32 has on its inner base grooves 38 in which are received corresponding grooves 40 formed at the end of a torsion bar 42 arranged coaxially within tubular shaft 32. Torsion bar 42 extends over the entire length of shaft 32 and, beyond reference plate 36, is fixed to an actuating part 44. The latter traverses a circular opening formed in the end of box part 12c and is supported in rotary manner in said opening by a ball bearing 46. Part 44 has, on the outside of box 12, an actuating plate 44a integral with part of the remote manipulator, which is mobile with respect to the box.

Actuating member 44 also comprises a part in the form of a plate or disk located within part 12c of the box and defining a surface 44b facing one of the faces of reference plate 36. The other face of plate 36 faces a surface 12d formed on box part 12b. The rotation of the reference plate 36 compared with the box is measured by means of a first potentiometer 48 positioned between surface 12d of the box and the facing face of plate 36. In a comparable manner, rotation of actuating member 44 relative to reference plate 36 is detected by means of a potentiometer 50 placed between surface 44b and the facing face of plate 36. Potentiometers 48 and 50 can be replaced by any other position coding system, such as optical coders.

As a result of this arrangement, it is clear that potentiometer 48 makes it possible to measure the angular displacement between reference plate 36 and the box, i.e. when no force is applied to torsion bar 42, the angular displacement of member 44 with respect to the box. Potentiometer 48 consequently indicates the position of member 44 relative to the box, to within the angular sag of the torsion bar. Obviously the torsion bar 42 could be replaced with any other mechanical connection means between the led part 22 and the part 44 defining an angular sag. Thus, it is possible to use for this purpose two spiral springs mounted in opposition, or springs placed between two radially positioned plates.

In turn, potentiometer 50 makes it possible to detect the angular displacement between reference plate 36 and actuating part 44, i.e. the torsion of bar 42. Thus, potentiometer 50 provides an indication of the force exerted between part 44 and box 12. For example, the angular displacement can be 5° for a force of 3 kg.

As will become apparent from the remainder of the description, in combination with the torsion bar 42, these two potentiometers provide according to the present invention a reversible actuator, although the actual reducing gear 20 is not reversible.

By adding the values given by the two potentiometers, it is possible to obtain information on the position of part 44 relative to box 12. This is of particular interest when applied to robotics.

Obviously reducing gear 20 can be formed by any known means of this type having a sufficiently high reduction ratio to be compatible with the rotational speed transmitted to the rotor 16b of motor 16. As has been stated hereinbefore, such a gear is generally only slightly or not reversible.

As a non-limitative embodiment, a description will now be given, with reference to FIGS. 2a and 2b, of the operation of the reducing gear used in the actuator of FIG. 1. This gear is of a known type and is commonly called a harmonic drive.

Figure 2:
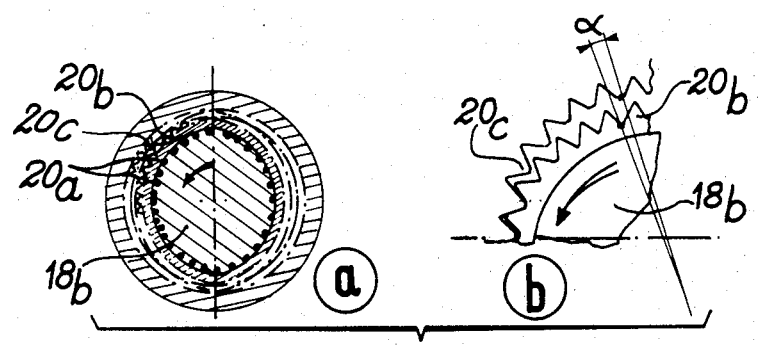
FIGS. 2a and 2b the operation of the reducing gear used in the actuator of FIG. 1.

As is illustrated by FIGS. 1 and 2a, the leading part 18 has a portion 18b forming an elliptical inner race for balls 20a of a ball bearing, whose outer race is formed on a flexible steel ring 20b adapting to the elliptical shape of the inner race. As is shown in FIG. 1, ring 20b has outer teeth, which are simultaneously meshed along two diametrically opposite generatrixes, both with inner teeth 20c formed on a ring fixed to part 12b of the box and to inner teeth 20d formed on ring 22a of the led part 22.

It can be seen in FIG. 2b that the number of teeth of toothed ring 20b differs from that of the teeth 20c formed on the box, in such a way that the rotation of the race carried by portion 18b within ring 20b has the effect of rotating the latter within fixed teeth 20c by an angle α corresponding to the displacement between the teeth for a given rotation of the leading part 18.

Moreover, as the number of teeth in 20d is the same as that in ring 20b, this rotation of the latter leads to the rotation of led part 22 by the same angle α.

It is clear that the reduction ratio of such a reducing gear is very high, because if the displacement between the number of teeth of 20b and 20c is only one, a rotation of the led part 22 by an angle a corresponding to the pitch of teeth 20c will correspond to one rotation of the leading part 18. As has been stated, such a gear is only slightly or not reversible.

Figure 3:
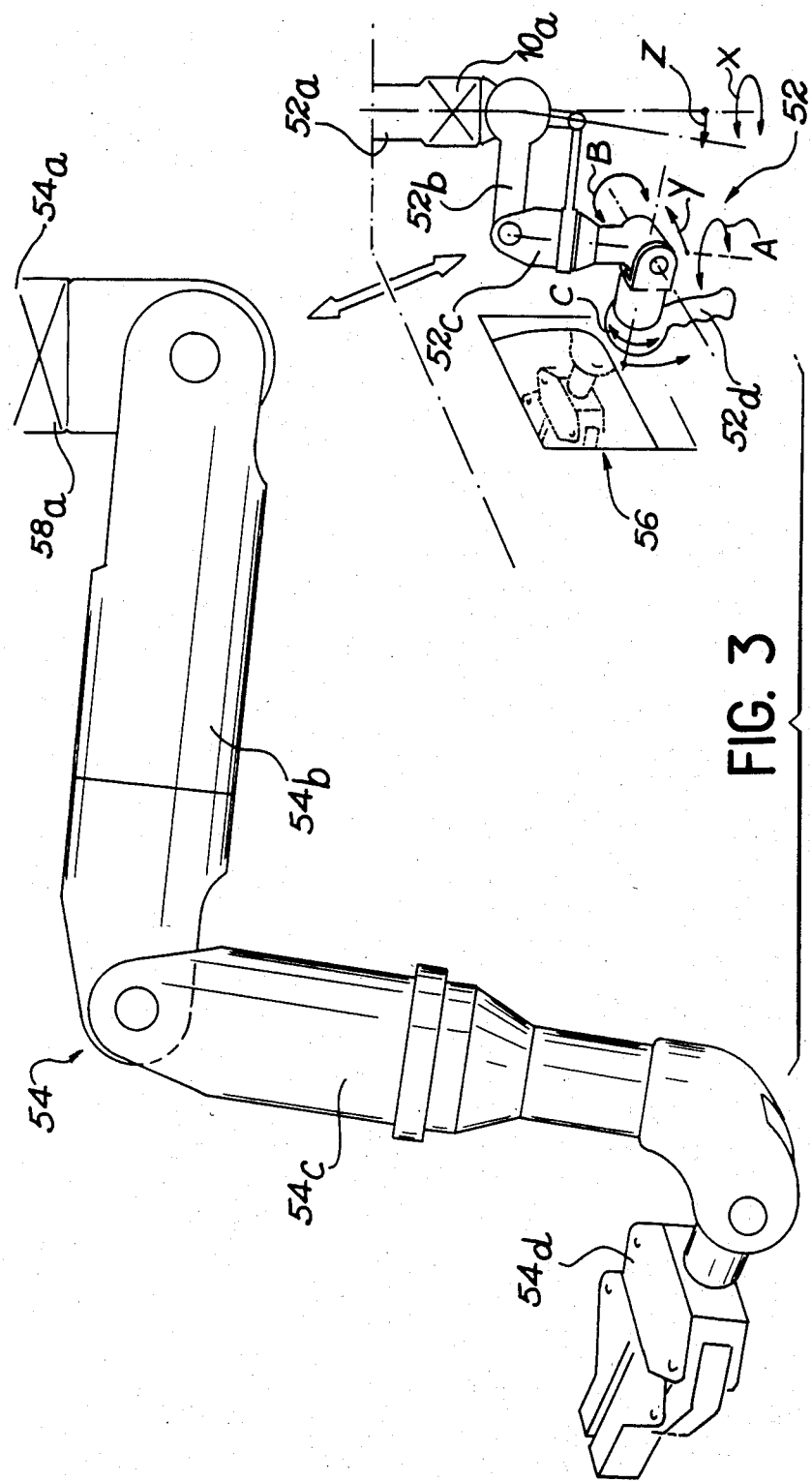
FIG. 3 an application of the actuator according to the invention to controlling the movements of a miniaturized master arm ensuring the remote control of a hydraulically controlled slave arm having normal dimensions.

As is more particularly illustrated in FIG. 3, the actuator according to the invention can be used for controlling each of the movements of a remote manipulator. Thus, it shows a miniaturized master arm 52 remotely controlling a slave arm of normal size 54. The master arm 52 can in particular be installed within an underwater vehicle, a slave arm 52 being outside the vehicle and monitored either through a porthole, or with the aid of a picture displayed on a television screen 56.

For example, master arm 52 can comprise a vertically axed support 52a and an arm 52b mounted in pivotal manner about the vertical axis of support 52a (movement X) and about a shoulder axis perpendicular to said first axis (movement Z). A forearm 52c is articulated to arm 52b about an elbow axis parallel to the shoulder axis (movement Y). The end of forearm 52c supports a handle 52d and can rotate about the forearm axis (azimuth movement A). Handle 52d is also articulated about an axis perpendicular to the forearm axis (lifting movement B) and about a second axis perpendicular to the aforementioned axis (pivotal movement C). Finally, the handle has a pawl controlling the opening and closing movements of the slave arm grippers.

The slave arm 54 then has in the same way a vertically axed support 54a, an arm 54b, a forearm 54c and grippers 54d, which can pivot with respect to one another in the same way as the corresponding parts of the master arm.

An actuator 10 according to the invention corresponds to each of the positioning movements (X, Y, and Z) and orientation movements (A, B and C) of the master arm. For simplification purposes, only the actuator 10a controlling the pivoting of the assembly of the master arm about the vertical axis of support 52a is shown in FIG 3. An actuator on slave arm 54 corresponds to each of the aforementioned actuators. Thus, an actuator 58a, which can in particular be formed by a hydraulic jack, corresponds to actuator 10a. This jack is equipped with a force or pressure measuring system, as well as a position detector such as a potentiometer. The measured pressure gives an idea of the load applied to the slave arm.

Figure 4:
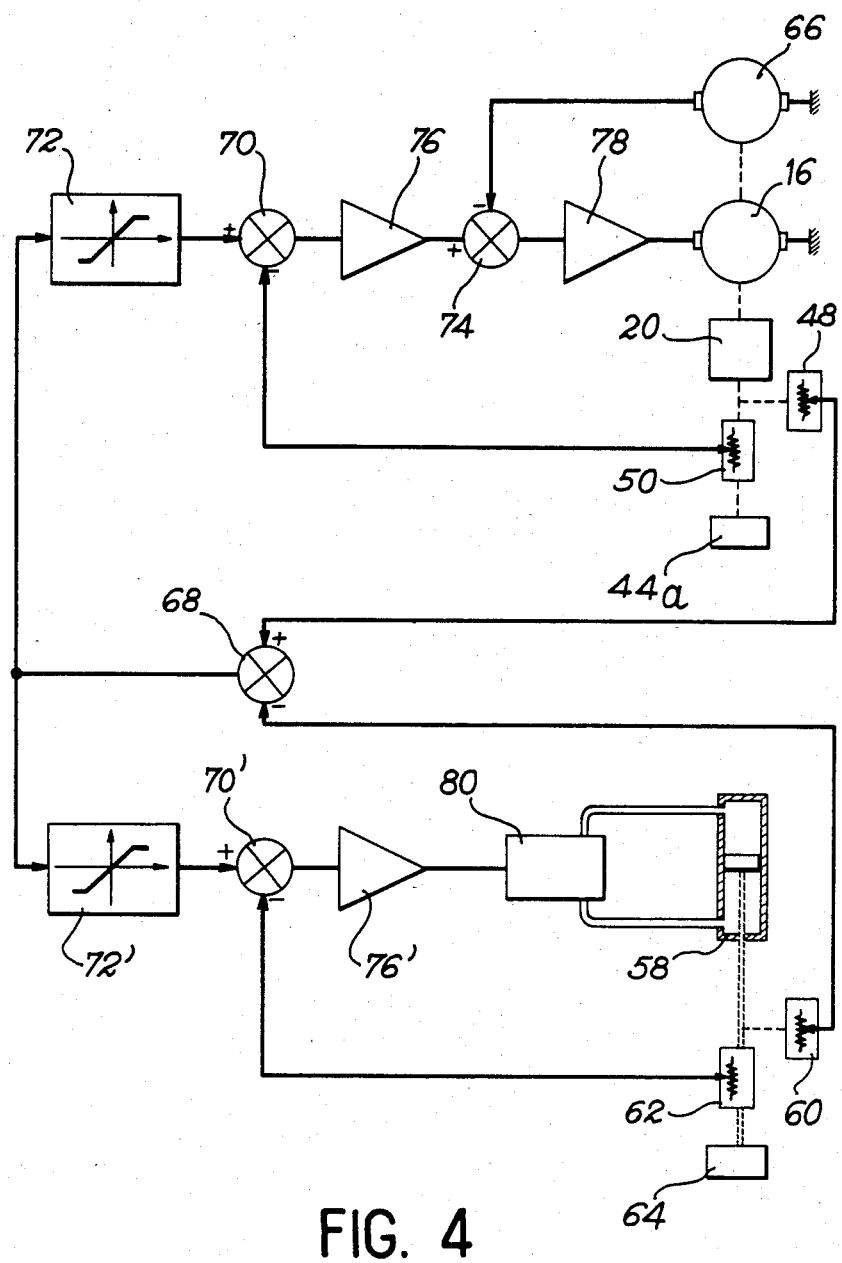
FIG. 4 a servocontrol circuit which can be used for controlling each of the movements of the remote manipulator of FIG. 3.

A servocontrol circuit, like that shown in FIG. 4, corresponds to each of the actuating assemblies of type 10a–58a.

The following description relates to a position-position, force return, master-slave remote manipulator, but the latter can also be of the position-force or force-position types.

It is possible to see motor 16, reducing gear 20, potentiometers 48 and 50 and actuating plate 44a of actuator 10. It is also possible to see jack 58 and the position potentiometer 60 and force potentiometer 62 associated therewith, as well as the moving part 64 controlled by the jack. On the master side, motor 16 is controlled by a tachogenerator 66.

The position signals supplied by potentiometers 48 and 60 are injected into a substractor 68, whose output signal is injected, on the master side, into a subtractor 70, after having passed into a limiter 72. The second input terminal of subtractor 70 receives the signals from force potentiometer 50. The output signal of subtractor 70 is injected into a second subtracter 74, after passing through an amplifier 76. Subtracter 74 compares this signal with the signal from generator 66 in order to supply an output signal controlling motor 16 through a second amplifier 78.

On the slave side, the same type of comparison is made between the output signal of subtracter 68 and the signal supplied by the force potentiometer 62. Thus, there is a limiter 72', a subtracter 70' and an amplifier 76'. The signal supplied by this amplifier is directly injected into a servovalve 80 controlling jack 58.

The remote manipulator described hereinbefore with reference to FIGS. 3 and 4 functions in the following way.

On assuming that the slave arm 54 is balanced, when no corresponding movement is performed on the master arm, potentiometer 62 associated with jack 58 supplies no signal in the absence of a load. In the same way, if the master arm is balanced, no signal appears at 50. On further assuming that the position of the two arms is such that the difference between the signals supplied by potentiometers 48 and 60 (value which can be read at the output of subtracter 68) is zero. If a load is supplied to the slave arm in the considered movement direction, if there is still no movement on the part of the master arm, a pressure variation is detected by the potentiometer 62 and is transmitted to servovalve 80, which controls the advance of jack 58 in the direction in which it exerts the force.

Potentiometer 60 then detects a position modification.

The position difference between potentiometer 58 and potentiometer 60 appearing at the output of subtracter 68 leads on the one hand to the slowing down and stopping of jack 58 by the cancelling out of the control signal of servovalve 80 at the output of subtracter 70' and on the other hand to the rotating of motor 16, which leads to a displacement of potentiometer 48.

It is therefore obvious that the slave arm is in a state of equilibrium, that that the force measured by potentiometer 62 is in direct linear relationship with the position difference between potentiometers 48 and 60, whose value is available at the output of subtracter 68.

It is pointed out at this stage, that the difference measured at the output of subtracter 68 will not evolve, because the slave arm controlled by jack 58 will sag in order to retain its state of equilibrium as described hereinbefore.

If the operator firmly holds the master arm by control member 44a, the torsion bar will twist, detector 50 will measure a sag and, via substractor 70, will stop the movement of motor 16.

As for the slave arm, a state of equilibrium is obtained such that the force measured by the potentiometer 50 is in a directly linear relationship with the position difference between potentiometers 48 and 60 at the output of subtracter 68.

As the arrangement is symmetrical, any force exerted by the operator on the master arm at 44a will lead to an action on the slave arm, by a process identical to that described hereinbefore. The function of limiters 72 and 72' is to limit in absolute values the amplitude of the force exerted by the actuators.

It is assumed that the variation measured at the output of subtracter 68 exceeds the limitating valve of limiter 72 and that the operator exerts an ever-increasing force on actuator 44a. When the value from potentiometer 50 exceeds the limitation value of limiter 72, motor 16 is controlled and arm 44a moves back whilst the force exceeds the limitation value. In other words, the arm "disengages" for any force exceeding that for which the system is designed.

This limiter can be obtained by an appropriate choice of the values of the electronics causing the saturation of an amplifier stage. It is pointed out that the circuit of FIG. 4 includes a tachogenerator 66, whose action has not yet been described. It is in fact a circuit which is well known in the art under the name "tachymetric negative feedback", whose object is to improve the performance of the system. For simplification reasons, this generator does not appear in FIG. 1, but there is nothing to prevent it being added to the end of the motor. In the same way, for the slave part, it would be possible to add a speed negative feedback for improving the performance.

At 62 the circuit comprises a force transducer on the movement, which is a good solution. It would also be possible to make do with a pressure transducer on the hydraulic actuator. However, the performance of the system would then be slightly inferior, due to the friction of the jack or the hydraulic motor.

The force ratio between the master arm and the slave arm can be electronically regulated to a random value differing from the ratio of the maximum forces chosen for the master arm or the slave arm.

For each of the movements of master arm 52, the actuator 10 according to the invention makes it possible to ensure both the control of the displacement of the slave arm and to ensure a force return from the latter to the master arm.

Obviously the invention is not limited to this application and can be used in a general manner for any movement control in robotics.

Thus, the actuator according to the invention can also be used on a slave arm. In this case, the actuator according to the invention is substituted for each of the means 58 of FIG. 3. The force applied to the slave arm is detected by potentiometer 50 and compared with the force applied to the master arm for controlling the motor 16 of the corresponding actuator mounted on the master arm. Such an application in particular makes it possible to realize master-slave remote manipulators not having the disadvantages of the prior art cable or belt-operated manipulators.

Finally, a master arm like arm 52 equipped with actuators according to the invention could also advantageously be used for controlling a so-called heavy slave arm. It is known that this type of slave arm, which is able to handle very heavy loads, is at present controlled from a pushbutton control box and has no position or force return. In this case, potentiometers are added to the existing slave arm, which make it possible to detect the movements thereof and a bilateral position/position servocontrol is performed by comparing the position of the slave arm with that of the master arm for controlling the displacement of the slave arm. More specifically, for each of the movements, the actuator according to the invention corresponding to this movement is actuated, which has the effect of twisting the corresponding torsion bar. The force measured in this way at potentiometer 50 is directly transmitted to motor 16, which thus follows the forces exerted by the operator. The resulting displacement of the master arm is measured by potentiometer 48. It is compared with the corresponding position of the salve arm indicated by the corresponding potentiometer. The resulting signal is used for controlling the motor of the slave arm in order to displace the latter in the same way as the master arm.

Bearing in mind the slowness of the displacement of the slave arm, there can be a displacement between the master arm, whose displacement speed is not limited, and the slave arm. Due to the bilateral position/position servocontrol system, this displacement can be compensated by a rearward return of the master arm on the release thereof.

In the case of this use, the value of limiter 72 is reduced in order to ease the action of the operator. In fact this is not a true force return, because no force detection takes place at the slave arm.

What is claimed is:

1. An actuator, comprising a box or case, an electric motor having a stator fixed within the said box or case, a speed reducing gear located in the box or case and having a leading part driven by the rotor of the electric motor, an actuating part outside the box or case and connected to a led part of the reducing gear by angularly flexible mechanical connection means, first means for detecting a first angular displacement between the actuating part and the led part, and second means for detecting a second angular displacement between the led part and the box or case.

2. An actuator according to claim 1, wherein the mechanical connection means, the actuating part and the led part have a common rotation axis.

3. An actuator according to claim 1, wherein the angularly flexible mechanical connection means comprise a torsion bar.

4. An actuator according to claim 3, including a rigid tubular shaft arranged coaxially about the torsion bar in order to connect the led part of the reducing gear to a reference plate having opposite faces respectively positioned facing a surface of the box and a surface of the actuating part, the said means for detecting the first and second angular displacements being respectively mounted between the said surface of the actuating part and the corresponding surface of the plate and between the surface of the box and the corresponding surface of the plate.

5. A position servocontrol for a master-slave remote manipulator, comprising a master arm and a slave arm, each being capable of a plurality of movements between parts of said arms, wherein each movement of at least one of the arms of the remote manipulator is controlled by an actuator including a box or case, an electric motor having a stator fixed within the said box or case, a speed reducing gear located in the box or case and having a leading part driven by the rotor of the electric motor, an actuating part outside the box or case and connected to a led part of the reducing gear by angularly flexible mechanical connection means, first means for detecting a first angular displacement between the actuating parts and the led part, and second means for detecting a second angular displacement between the led part and the box or case, and wherein the servocontrol further comprises third means for detecting a position corresponding to the same position of the other arm, fourth means for determining the difference between a signal supplied by the second means and a signal supplied by the third means and fifth means for determining the difference between a signal supplied by the fourth means and a signal supplied by the first means, the signal supplied by said fifth means serving to control the electric motor.

6. A position servocontrol according to claim 5, wherein sixth means are provided for limiting to a given value the level of the signals transmitted by the fourth means to the fifth means.

7. A position servocontrol according to claim 5, wherein the actuator also comprises a tachogenerator associated with the electric motor and wherein the servocontrol also comprises seventh means for determining the difference between the signals supplied by the tachogenerator and the signals supplied by the fifth means, the signals supplied by the seventh means controlling the electric motor.

8. A position servocontrol according to claim 5, wherein each movement of the other arm is controlled by a second actuator with which are associated the third means and an eighth means for determining the force exerted by said second actuator, the servocontrol further comprising ninth means for determining the difference between the signals supplied by the fourth means and by the eighth means, the signal supplied by the ninth means serving to control the second actuator.

9. A position servocontrol according to claim 8, wherein means are provided for limiting to a given value, the level of the signals transmitted by the fourth means to the ninth means.

* * * * *